(12) United States Patent
Fairlie et al.

(10) Patent No.: US 12,145,751 B2
(45) Date of Patent: *Nov. 19, 2024

(54) SEPARATION DEVICE ASSEMBLIES

(71) Applicant: Ensign-Bickford Aerospace & Defense Company, Simsbury, CT (US)

(72) Inventors: William Fairlie, Agawam, MA (US); Erik Saucier, Vermon, CT (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,311

(22) Filed: Jul. 31, 2023

(65) Prior Publication Data

US 2023/0373660 A1 Nov. 23, 2023

Related U.S. Application Data

(63) Continuation of application No. 16/203,817, filed on Nov. 29, 2018, now Pat. No. 11,713,142.

(60) Provisional application No. 62/593,355, filed on Dec. 1, 2017.

(51) Int. Cl.
*B64G 1/64* (2006.01)
*F42B 15/38* (2006.01)

(52) U.S. Cl.
CPC .............. *B64G 1/645* (2013.01); *F42B 15/38* (2013.01)

(58) Field of Classification Search
CPC ........... B64G 1/645; F42B 15/38; F42B 15/36
See application file for complete search history.

(56) References Cited

U.S. PATENT DOCUMENTS

| | | | | |
|---|---|---|---|---|
| 3,230,885 A | * | 1/1966 | Weber | F42B 15/38 403/336 |
| 3,262,351 A | * | 7/1966 | Webb | F16B 37/0864 89/1.14 |
| 3,453,960 A | * | 7/1969 | Qualls | F42B 15/38 102/378 |
| 3,505,925 A | * | 4/1970 | Carr | F42B 15/38 102/378 |
| 3,633,456 A | * | 1/1972 | Carr | F42B 15/38 102/378 |
| 3,698,281 A | * | 10/1972 | Brandt | F42B 15/38 102/378 |
| 3,919,939 A | * | 11/1975 | Murray | B64C 1/32 102/307 |

(Continued)

*Primary Examiner* — Medhat Badawi
(74) *Attorney, Agent, or Firm* — McCarter & English, LLP; Dave S. Christensen (57) ABSTRACT

Separation device assemblies are provided. The assemblies include a plurality of first segment elements, each first segment element having an attachment portion and a frangible portion, the attachment portion of the first segment elements is arranged to fixedly connect to a first structural component and at least one second segment element having an attachment portion and a securing portion, wherein the attachment portion of the at least one second segment element is arranged to fixedly connect to a second structural component. At least two of the plurality of first segment elements are attached to the at least one second segment element adjacent to each other and a first segment joint is formed between adjacent first segment elements. An expansion device cavity is formed between the attached first and second segment elements.

16 Claims, 5 Drawing Sheets

(56) References Cited

U.S. PATENT DOCUMENTS

| | | | | |
|---|---|---|---|---|
| 3,993,001 A * | 11/1976 | Hawes | B21D 26/08 | 29/890.044 |
| 4,106,875 A * | 8/1978 | Jewett | F16B 31/005 | 403/379.3 |
| 4,137,848 A * | 2/1979 | Cunha | F42B 15/38 | 102/378 |
| 4,257,639 A * | 3/1981 | Stock | B64D 7/08 | 294/82.26 |
| 4,516,499 A * | 5/1985 | Eyman | F42B 15/36 | 102/377 |
| 4,648,227 A * | 3/1987 | Reusch | F42B 3/093 | 102/378 |
| 4,664,033 A * | 5/1987 | Burkdoll | F42D 1/04 | 102/275.2 |
| 4,685,376 A * | 8/1987 | Noel | F42B 15/38 | 60/632 |
| 4,742,773 A * | 5/1988 | Bartholomew | C06C 5/06 | 102/202.13 |
| 4,825,764 A * | 5/1989 | Jullien | F42D 1/043 | 102/275.12 |
| 4,879,941 A * | 11/1989 | Repe | F42B 12/60 | 102/393 |
| 5,010,823 A * | 4/1991 | Morrison | F42B 15/38 | 102/307 |
| 5,056,950 A * | 10/1991 | Rateick, Jr. | F16B 7/042 | 403/24 |
| 5,109,749 A * | 5/1992 | Olcer | F42B 15/38 | 102/378 |
| 5,123,356 A * | 6/1992 | Brooks | E21B 43/116 | 102/275.12 |
| 5,129,306 A * | 7/1992 | Fauvel | F42B 15/38 | 102/378 |
| 5,147,976 A * | 9/1992 | Laurensou | F42D 1/04 | 102/275.3 |
| 5,327,835 A * | 7/1994 | Adams | F42D 1/043 | 102/275.12 |
| 5,331,894 A * | 7/1994 | Wassell | F42B 15/36 | 102/275.12 |
| 5,365,851 A * | 11/1994 | Shaw | F42D 1/04 | 102/275.6 |
| 5,372,071 A * | 12/1994 | Richards | F42B 15/38 | 102/378 |
| 5,390,606 A * | 2/1995 | Harris | B64G 1/645 | 102/378 |
| 5,392,684 A * | 2/1995 | Renfro | F42B 15/38 | 102/378 |
| 5,402,720 A * | 4/1995 | Bottorff | F42B 15/36 | 60/225 |
| 5,417,162 A * | 5/1995 | Adams | F42D 1/043 | 102/317 |
| 5,423,263 A * | 6/1995 | Rontey | C06C 5/06 | 102/275.12 |
| 5,535,502 A | 7/1996 | Harris | | |
| 5,735,626 A * | 4/1998 | Khatiblou | F16B 5/0016 | 102/275.12 |
| 5,743,492 A * | 4/1998 | Chan | B64G 1/401 | 102/378 |
| 5,898,123 A * | 4/1999 | Fritz | C06C 5/06 | 102/378 |
| 5,992,328 A * | 11/1999 | Blain | F42B 15/38 | 102/378 |
| 6,021,715 A * | 2/2000 | Fritz | F42B 15/38 | 102/378 |
| 6,076,467 A * | 6/2000 | Cespedosa | B64G 1/645 | 102/377 |
| 6,125,762 A * | 10/2000 | Fritz | F42B 15/38 | 102/378 |
| 6,584,907 B2 * | 7/2003 | Boucher | B60R 21/017 | 102/202.7 |
| 6,662,702 B1 * | 12/2003 | Vidot | G05G 1/323 | 89/1.14 |
| 6,675,692 B1 * | 1/2004 | Goetz | B60R 21/13 | 102/202.1 |
| 6,820,559 B1 * | 11/2004 | Comtesse | B64G 1/645 | 102/378 |
| 6,901,836 B1 * | 6/2005 | Valembois | B23D 15/145 | 225/6 |
| 6,925,939 B2 * | 8/2005 | Cleveland | F42B 3/006 | 403/321 |
| 7,127,994 B2 * | 10/2006 | Cleveland | B64G 1/645 | 102/378 |
| 7,261,038 B2 * | 8/2007 | Cleveland | B64G 1/645 | 102/378 |
| 7,509,903 B2 * | 3/2009 | Facciano | F42B 15/38 | 89/36.01 |
| 7,513,184 B2 * | 4/2009 | Kister | B64G 1/645 | 83/639.4 |
| 7,775,147 B2 * | 8/2010 | Crawford | F42B 10/50 | 244/113 |
| 7,819,048 B2 * | 10/2010 | Facciano | F42B 15/38 | 89/36.01 |
| 8,141,491 B1 * | 3/2012 | Travis | F42B 15/38 | 102/377 |
| 8,607,705 B2 * | 12/2013 | Golden | F42B 15/38 | 102/377 |
| 8,607,706 B2 * | 12/2013 | Kister | B64G 1/645 | 102/378 |
| 8,695,473 B2 * | 4/2014 | Kametz | F42B 15/38 | 102/378 |
| 9,027,481 B2 * | 5/2015 | Kister | F42B 15/38 | 102/378 |
| 9,086,260 B2 * | 7/2015 | Kister | F42B 15/38 | |
| 10,184,766 B2 * | 1/2019 | Medina | F42B 15/38 | |
| 10,228,224 B2 * | 3/2019 | Comtesse | F42B 15/38 | |
| 10,281,252 B2 * | 5/2019 | Korach | F02K 9/605 | |
| 10,343,795 B2 * | 7/2019 | Rivas | B64G 1/641 | |
| 10,669,048 B1 * | 6/2020 | Tanner | B64G 1/645 | |
| 10,739,120 B2 * | 8/2020 | Cohen | B64G 1/645 | |
| 10,801,822 B2 * | 10/2020 | Wilson | F42B 33/008 | |
| 10,934,029 B2 * | 3/2021 | Bower | B64G 1/645 | |
| 11,247,788 B2 * | 2/2022 | Rivas | B64G 1/10 | |
| 11,565,835 B1 * | 1/2023 | Weinberg | B64G 1/645 | |
| 11,572,203 B2 * | 2/2023 | Conrad | F42B 15/36 | |
| 11,713,142 B2 | 8/2023 | Fairlie et al. | | |
| 2001/0025564 A1 * | 10/2001 | Forys | F15B 15/19 | 89/1.14 |
| 2003/0196544 A1 * | 10/2003 | Comtesse | F42B 15/38 | 89/1.14 |
| 2004/0057787 A1 * | 3/2004 | Cleveland | B64G 1/641 | 403/374.1 |
| 2004/0216634 A1 * | 11/2004 | Cleveland | F42B 15/36 | 102/378 |
| 2013/0236234 A1 * | 9/2013 | Kaczynski | B64G 1/645 | 102/275.1 |
| 2019/0168898 A1 * | 6/2019 | Fairlie | F42B 15/38 | |
| 2019/0168899 A1 * | 6/2019 | Fairlie | F42B 15/38 | |
| 2023/0010986 A1 * | 1/2023 | Conrad | B64G 1/645 | |

* cited by examiner

SEPARATION DEVICE ASSEMBLIES

CROSS-REFERENCE TO RELATED APPLICATIONS

The present application is a Continuation of U.S. Non-Provisional application Ser. No. 16/203,817, filed Nov. 29, 2018, which claims priority from U.S. Provisional Patent Application No. 62/593,355, filed Dec. 1, 2017. The contents of the priority application are hereby incorporated by reference in their entirety.

BACKGROUND

The subject matter disclosed herein generally relates to separation device assemblies and, more particularly, to modular frangible joint separation device assemblies.

Linear explosive frangible joints are used to explosively separate two components, such as that of a launch vehicle, satellite, or other type of space or air travel vehicle during flight or operation (e.g., to separate two vehicle stages or to separate a payload from a launch vehicle). For example, it is known to utilize a single, elongated, flexible continuous explosive cord that comprises, e.g., a mild detonating fuse ("MDF") that explodes upon detonation. The explosive cord may be encased in a silicone rubber or other pliable material that is surrounded by a stainless steel tube. This arrangement may be applied to a portion or all of the periphery or circumference of a joint, connection point or location between two components that are desired to be explosively separated at that location at a predetermined time. The explosive cord is typically initiated at one or more ends of the cord and the cord causing the cord to explosively detonate along its length to separate the components.

However, due to the nature of the structural components that are joined (and then separated) by the frangible joints, each application is unique. For example, the frangible joints may include one or more flanges or other structures that are arranged to specifically attach to a portion of the structural component. Each application is different and thus each application may require a different arrangement of flanges or other attachment mechanisms. Accordingly, it may be desirable to improve frangible joints to be more versatile in application.

SUMMARY

According to some embodiments, separation device assemblies are provided. The assemblies include a plurality of first segment elements, each first segment element having an attachment portion and a frangible portion, the attachment portion of the first segment elements is arranged to fixedly connect to a first structural component and at least one second segment element having an attachment portion and a securing portion, wherein the attachment portion of the at least one second segment element is arranged to fixedly connect to a second structural component. At least two of the plurality of first segment elements are attached to the at least one second segment element adjacent to each other, wherein a first segment joint is formed between adjacent first segment elements. An expansion device cavity is formed between the attached first and second segment elements.

In addition to one or more of the features described herein, or as an alternative, further embodiments of the separation device assembly may include that each first segment element includes a fracture groove.

In addition to one or more of the features described herein, or as an alternative, further embodiments of the separation device assembly may include that the frangible portion of each first segment element comprises a first arm and a second arm.

In addition to one or more of the features described herein, or as an alternative, further embodiments of the separation device assembly may include a gap located between adjacent first segment elements when attached to the at least one second segment element.

In addition to one or more of the features described herein, or as an alternative, further embodiments of the separation device assembly may include that the at least one second segment element has a length that is longer than a single first segment element.

In addition to one or more of the features described herein, or as an alternative, further embodiments of the separation device assembly may include an expansion device located within the expansion device cavity, wherein expansion of the expansion device causes the frangible portions of the first segment elements to separate the separation device assembly.

In addition to one or more of the features described herein, or as an alternative, further embodiments of the separation device assembly may include that the at least one second segment element comprises a plurality of second segment elements.

In addition to one or more of the features described herein, or as an alternative, further embodiments of the separation device assembly may include that each second segment element is a same length as each first segment element.

In addition to one or more of the features described herein, or as an alternative, further embodiments of the separation device assembly may include that each second segment element is a length that is shorter than each first segment element.

In addition to one or more of the features described herein, or as an alternative, further embodiments of the separation device assembly may include that each first segment element comprises a plurality of fastener apertures and each second segment element comprises a plurality of fastener apertures, wherein when attaching the first segment elements to the second segment In addition to one or more of the features described herein, or as an alternative, further embodiments of the separation device assembly may include that a first segment joint is formed between adjacent first segment elements and a second segment joint is formed between adjacent second segment elements, and wherein when the first segment elements are attached to the second segment elements, the first segment joints do not align with the second segment joints.

In addition to one or more of the features described herein, or as an alternative, further embodiments of the separation device assembly may include that at least one of the first segment joints and the second segment joints includes a gap between the adjacent first segment elements or the adjacent second segment elements.

In addition to one or more of the features described herein, or as an alternative, further embodiments of the separation device assembly may include that the gap is a spacing that is at or below a predetermined or preset distance.

In addition to one or more of the features described herein, or as an alternative, further embodiments of the separation device assembly may include that both the first segment joints and the second segment joints include a gap between the adjacent first segment elements and the adjacent second segment elements.

In addition to one or more of the features described herein, or as an alternative, further embodiments of the separation device assembly may include that each first segment element is five feet in length or less and each second segment element five feet in length or less.

In addition to one or more of the features described herein, or as an alternative, further embodiments of the separation device assembly may include that each first segment element is five feet in length or less.

In addition to one or more of the features described herein, or as an alternative, further embodiments of the separation device assembly may include that the second segment element is ten feet in length or longer.

According to some embodiments, separation devices and assemblies as shown and described herein are provided.

According to some embodiments, segments for forming separation devices and separation assemblies as shown and described herein are provided.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
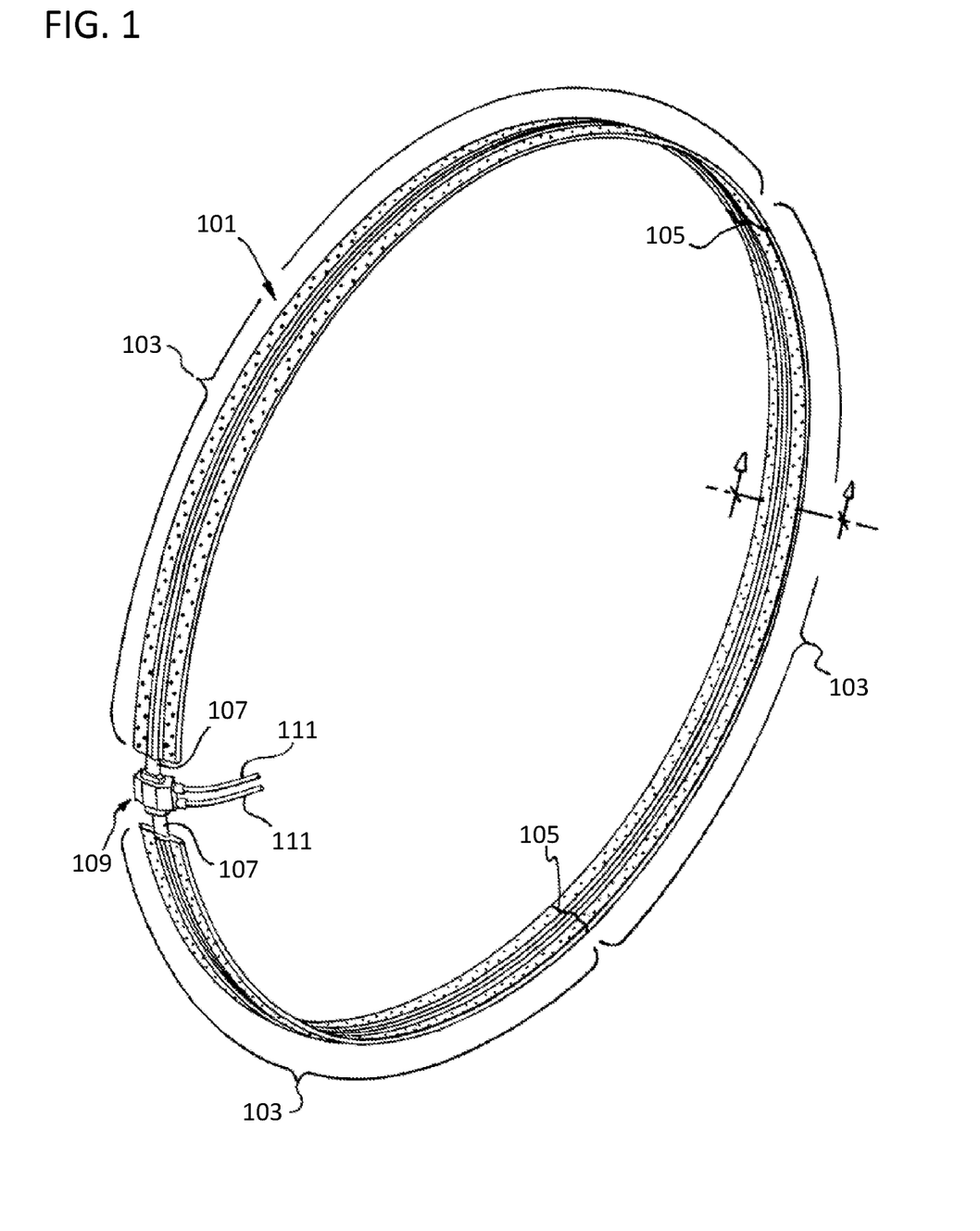
FIG. 1 is a perspective view of a segmented separation structure in accordance with one embodiment of the present disclosure.

FIG. 1 schematically illustrates a segmented separation structure 101, such as a frangible joint. The segmented separation structure 101, having a plurality of segments 103. The segments 103 are jointed or attached at seams 105, with connections achieved as will be appreciated by those of skill in the art. An expansion device 107 is positioned within the segments 103. The ends of the expansion device 107 are connected to a detonation manifold 109 that is in signal transfer communication with one or more of signal transfer lines 111 in a manner well known to those skilled in the art.

The signal transfer lines 111 are used to communicate an activation signal to the detonation manifold 109. Activation of the detonation manifold 109 triggers expansion of the expansion device 107 within the segments 103. As the expansion device 107 expands, the segments 103 will separate or split apart such that two ends of the segments will separate from each other. In one example, the segmented separation structure 101 can be mounted between and removably attach two structural components (e.g., portions of a launch vehicle). When the segments 103 are split apart, the two structural components can be separated.

Figure 2A:
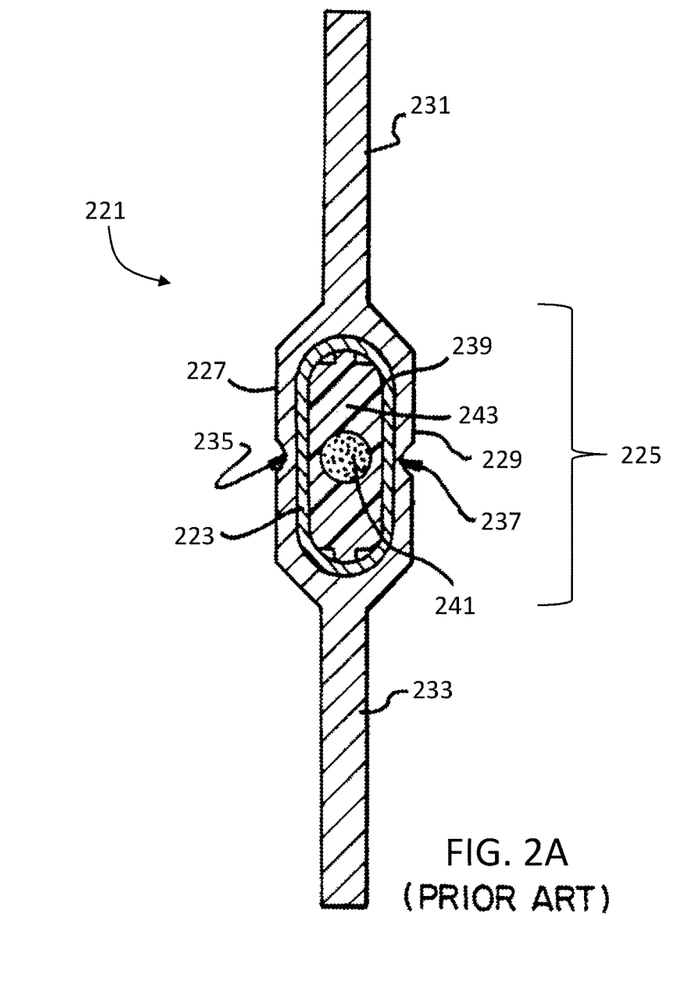
FIG. 2A is a partial cross-sectional view of an example prior art separation device assembly.
Figure 2B:
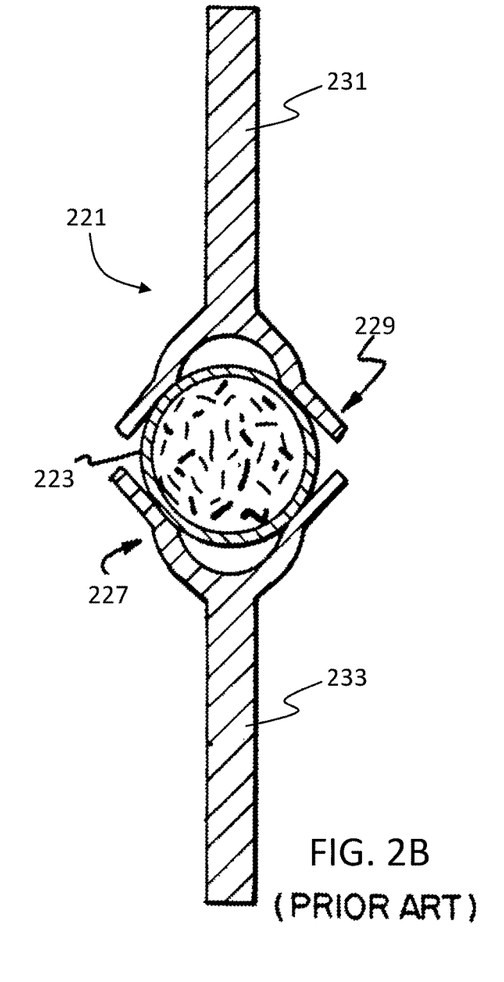
FIG. 2B is a view similar to that of FIG. 2A of the prior art separation device assembly after detonation.

Turning now to FIGS. 2A-2B, a typical segment 221 of a separation device assembly is shown in cross section. The segment 221 may be a portion of a separation device assembly such as that shown in FIG. 1. As shown, an expansion device 223 is disposed within a frangible joint 225 which may be an aluminum member having a release portion comprising separation walls 227, 229, which in part define an internal channel, cavity, or chamber for receiving the expansion device 223. As shown, mounting flanges 231, 233 extend from the frangible joint 225 and are each arranged to attach to a portion of a respective structural component. For example, the mounting flanges 231, 233 can be designed to fixedly attach or connect two adjacent structural components, as will be appreciated by those of skill in the art. Thus, the mounting flanges 231, 233 may be customized to a specific application to properly connect to and join two structural components. That is, although shown as flat mounting flanges 231, 233 extending from the frangible joint 225, those of skill in the art will appreciate that various geometries, shapes, sizes, etc. may be employed for the mounting flanges, which can be dictated by specific applications and/or requirements. In the arrangement of FIG. 2A, illustrating pre-separation, the frangible joint 225 of the segment 221 can function like a butt plate between two structural components to be separated.

The expansion device 223 is positioned lengthwise in the channel formed in the frangible joint 225. The separation walls 227, 229 each have fracture grooves 235, 237 that are designed to provide a clean fracture of the separation walls 227, 229 in response to expansion of the expansion device 223. The expansion of the expansion device 223 is achieved by detonation of a charge 239. As shown, the charge 239 includes a fuse 241 and an explosive 243. Activation (detonation) of the charge 239 will cause the expansion device 223 to expand laterally outward to a substantially circular cross-sectional configuration as shown in FIG. 2B. As the expansion device 223 expands it will apply force upon the separation walls 227, 229 along the length of the segment 221. The force applied by the expanding expansion device 223 will cause the separation walls 227, 227 to break or fail at the fracture grooves 235, 237, thus separating the two mounting flanges 231, 233 from each other at the location of the frangible joint 225. That is, the mounting flanges 231, 233 and any associated structural components are separated upon detonation of the charge 239 and expansion of the expansion device 223.

As shown in FIGS. 2A-2B, the mounting flanges 231, 233 are integrally formed with the frangible joint 225 as a unitary body or structure, with the charge 239 located therein. As noted above, the shape, size, dimensions, etc. of the mounting flanges 231, 233 are customized to application specifications. Thus, each time a new arrangement of structural component to be separated is designed, a new and specifically customized separation device assembly must be designed and prepared.

Typical segments of prior art segmented separation structures and/or assemblies are formed from relatively long segments (e.g., on the order of ten feet or longer). The long segments are manufactured as such due to costs associated with manufacturing and machining constraints. For example, referring to FIGS. 1 and 2A, each prior art segment 103 may be ten feet or longer in length and have a cross-sectional construction similar to the segment 221 shown in FIG. 2A. In some cases these large prior art segments 103, when combined together, can form separation structures having a desired length, and in some non-limiting embodiments a length that is greater than 20 feet. Such large or long segments thus require certain manufacturing capabilities, which results in increased manufacturing costs and slower production times. However, it may be advantageous to enable smaller scale manufacturing process through the manufacture of relatively short (or shorter) segments for separation assemblies.

Accordingly, embodiments provided herein are directed to separation device assemblies that enable short segments ("segment elements") and ease of manufacture. Such segment elements, in accordance with some embodiments of the present disclosure, may be on the order of five feet or less, and thus may be half the length of typical segments (or even less). In accordance with embodiments of the present disclosure, each segment element can be manufactured to a required curvature as a stand-alone piece that is configured to join with one or more other segment elements (e.g., a non-unitary segment, as shown in FIGS. 1 and 2A).

The segment elements of the present disclosure can be fastened or joined together to form a full arc or ring frangible joint assembly (e.g., similar to the segmented separation structure 101 shown in FIG. 1). In some embodiments, the segment elements are arranged such that a first segment element does not align with a second segment element, as least with respect to joints and/or adjacent first segments elements relative to adjacent second segment elements, as shown and described herein.

Figure 3:
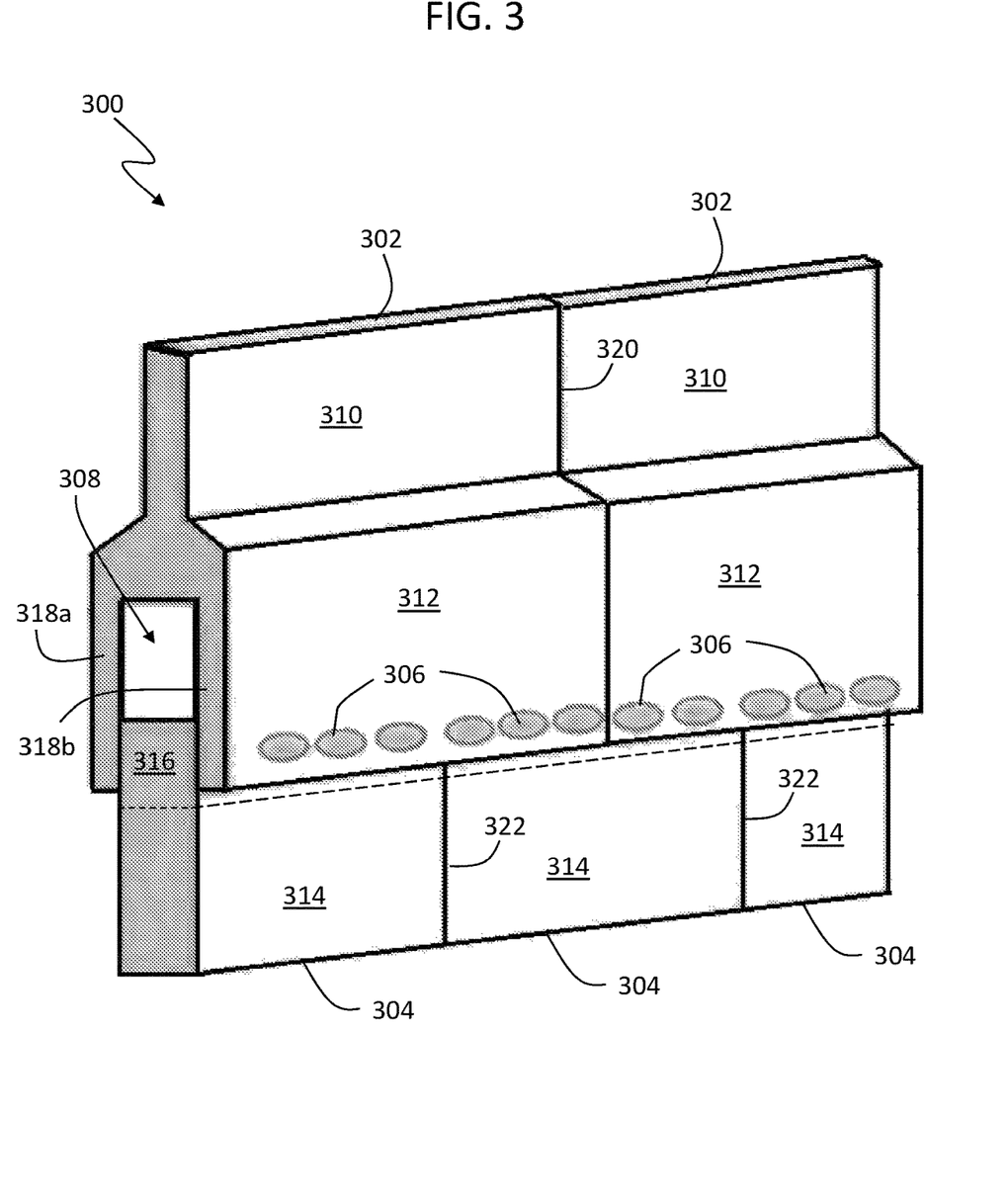
FIG. 3 is a schematic illustration of a separation device assembly in accordance with an embodiment of the present disclosure.

Turning now to FIG. 3, a schematic illustration of an embodiment of a separation device assembly 300 in accordance with the present disclosure is shown. The separation device assembly 300 is formed from a plurality of first segment elements 302 and a plurality of second segment elements 304. The first segment elements 302 are joined, connected, or attached to the second segment element 304 by fasteners 306. When joined together, the first segment elements 302 and the second segment elements 304 define a portion of the separation device assembly 300, and, as shown, an expansion device cavity 308 is defined as a space between the first segment elements 302 and the second segment elements 304. The expansion device cavity 308 is arranged to receive and contain an expansion device therein. The expansion device is designed to expand and separate at least a portion of the first segment elements 302 from the second segment elements 304 and thus enable separation of structural components attached to the respective first and second segment elements 302, 304.

As shown, the first segment elements 302 include respective attachment portions 310 and frangible portions 312. Similarly, the second segment elements 302 include respective attachment portions 314 and securing portions 316. The attachment portions 310, 314 of the first and second segment elements 302, 304 are arranged to fixedly attach and/or mount to structural components, such as portions of launch vehicles, with the structural components designed to be attached to each other by the separation device assembly 300 until an expansion device is activated and then the structural components are separated as the separation device assembly 300 is activated/separated.

Each first segment element 302 is substantially the same as the other first segment elements 302, thus, when positioned adjacent to each other, as shown in FIG. 3, a substantially uniform structure is formed. The frangible portions 312 of the first segment elements 302 are arranged to secure to the securing portions 316 of the second segment elements 304. In the illustrative embodiment of FIG. 3, the frangible portions 312 of the first segment elements 302 have a clevis or forked shape. That is, the frangible portions 312 of the first segment elements 302 include a first arm 318a and a second arm 318b. The arms 318a, 318b are separated by a distance to enable both an expansion device to fit therebetween and also to enable receiving and engaging with the securing portion 316 of the second segment elements 304, as shown.

In operation, when an expansion device is active (within the expansion device cavity 308, the expansion device will apply force to the arms 318a, 318b to cause the separation device assembly 300 to break apart or separate, as will be appreciated by those of skill in the art. However, to retain the structural integrity of the separation device assembly 300 prior to activation of the expansion device, the first segment elements 302 and the second segment elements 304 are rigidly and fixedly connected such that they can hold two structural components together. To achieve such connection and rigidity, the fasteners 306 are spaced and number sufficiently to maintain such rigidity. In some embodiments, rather than employing fasteners, other types of connection mechanisms and/or means may be employed. For example, various types of fasteners, adhesives, interlock elements, etc. can be employed. Further, in some embodiments, welding, or other types of bonding between the first and second segment elements 302, 304 can be used.

As shown in FIG. 3, adjacent first segment elements 302 have a first segment joint 320 therebetween. Similarly, adjacent second segment elements 304 have a second segment joint 322 therebetween. When assembled to form the separation device assembly 300, the first segment joints 320 are offset or not aligned with the second segment joints 322. Such offset can aid in the structural integrity and rigidity of the separation device assembly 300 as a single unit or structure. In some embodiments, the first and/or second segment joints 320, 322 can be joined, such as by welding, although in other embodiments, no direct connection may be made between adjacent segment elements.

Figure 4:
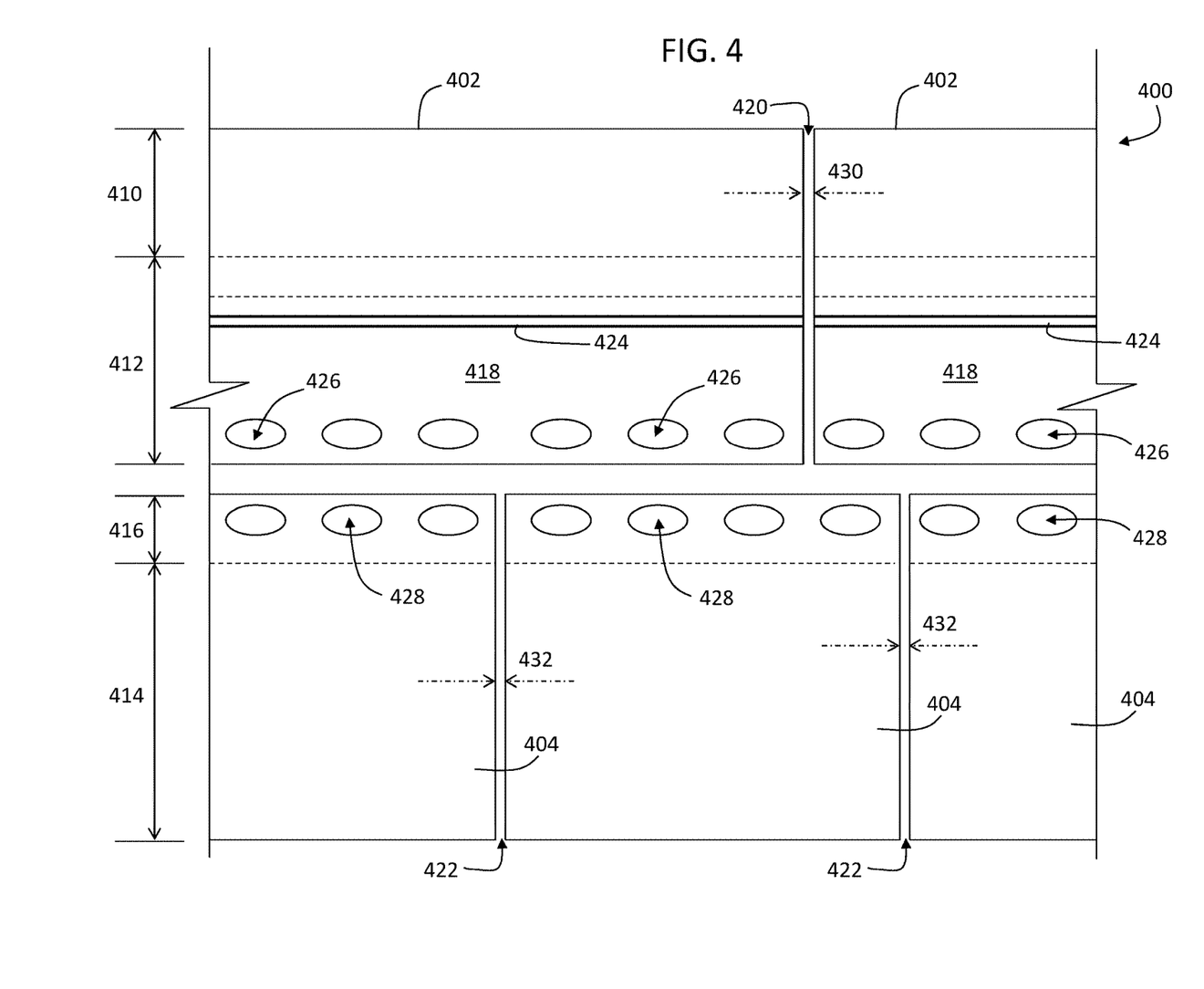
FIG. 4 is a schematic illustration of a separation device assembly in accordance with an embodiment of the present disclosure.

Turning now to FIG. 4, a side elevation view of a separation device assembly 400 in accordance with an embodiment of the present disclosure is shown. The separation device assembly 400 is similar to the separation device assembly 300 shown in FIG. 3, and includes multiple first and second segment elements 402, 404. The first segment elements 402 of the separation device assembly 400 include attachment portions 410 and frangible portions 412.

Similarly, the second segment elements 404 include attachment portions 414 and securing portions 416. The frangible portions 412 and the securing portions 416 of the first and second segment elements 402, 404, respectively, are configured to be mated and connected, and also define an expansion device cavity, as shown and described with respect to FIG. 3.

The first segment elements 402 include arms 418 that extend from the attachment portions 410 and form a part of the frangible portions 412. The arms 418 may be arranged in a forked or clevis manner (e.g., as shown in FIG. 3). As shown, the arms 418 in the embodiment shown in FIG. 4 extend below a fracture groove 424. The fracture groove 424 is a groove or depression in the surface or material of the frangible portion 412 that aids in the fracturing or separation of the separation device assembly 400 when an expansion device expands within an expansion device cavity of the separation device assembly 400. For example, the fracture grooves 424 can aid in the separation or breaking of the arms 418 from the first segment elements 402.

As noted the first segment elements 402 are attachable to the second segment elements 404. As shown, the frangible portions 412 of the first segment elements 402 include a plurality of fastener apertures 426. Similarly, the securing portions 416 of the second segment elements 404 include a plurality of fastener apertures 428. When the first segment portions 402 are fit to or arranged relative to the second segment portion 404 to form the separation device assembly 400, the fastener apertures 426, 428 of the first and second segment elements 402, 404 align to allow for a fastener to pass therethrough and securely fasten the first segment elements 402 to the second segment elements 404.

However, although the fastener apertures 426, 428 align when forming the separation device assembly 400, in this illustrative embodiment, a set of fastener apertures 426 on a single first segment element 402 will align with fastener apertures 428 of two different but adjacent second segment elements 404. Such arrangement allows for a rigid and/or solid separation device assembly 400 even though it is composed of a plurality of first and second segment elements 402, 404 which are relatively short. As shown, a first segment joint 420 does not align with a second segment joint 422, and thus an offset or unaligned arrangement employed.

Also shown in FIG. 4 is a gap defined between end walls of adjacent segment elements. The gap is present at the segment joints, and thus a first gap 430 exists between adjacent first segment elements 402 at the first segment joint 420 and a second gap 432 exists between adjacent second segment elements 404. The gaps 430, 432 can be set to predetermined or preset distances to allow for various movement and/or expansion/contraction of the material of the segment elements 402, 404. For example, the separation device assembly 400 may be used on a launch vehicle that is subject to extreme temperatures and/or vibrations and the gaps 430, 432 can prevent material or structural fatigue of the separation device assembly 400 during operation.

In the embodiments shown in FIGS. 3-4, the segment elements are substantially shorter than typical sections of segmented separation device assemblies. For example, a typical segment of a segmented separation device assembly may be about ten feet in length or longer. In contrast, segment elements of the present disclosure may be five in length or shorter. As noted above, an assembled separation structure can have a length greater than 20 feet. Thus, in prior systems, the typical segments may have comprised anywhere from 30-50% of the length of the entire assembled separation structure. In contrast, embodiments of the present disclosure are directed to segment elements that may each have a length of 25% or less of a total assembled length of the separation structure. The above described percentages and lengths are merely for example, and those of skill in the art will appreciated that embodiment of the present disclosure are not so limited.

In the above shown and described embodiments, the first and second segment elements are both of the shorter length. However, such arrangement is not required in accordance with embodiments of the present disclosure. For example, one of the first or second segment elements may be replaced by a unitary or substantially longer body, and a plurality of the other of the first or second segment elements may retain the shorter length.

Figure 5:
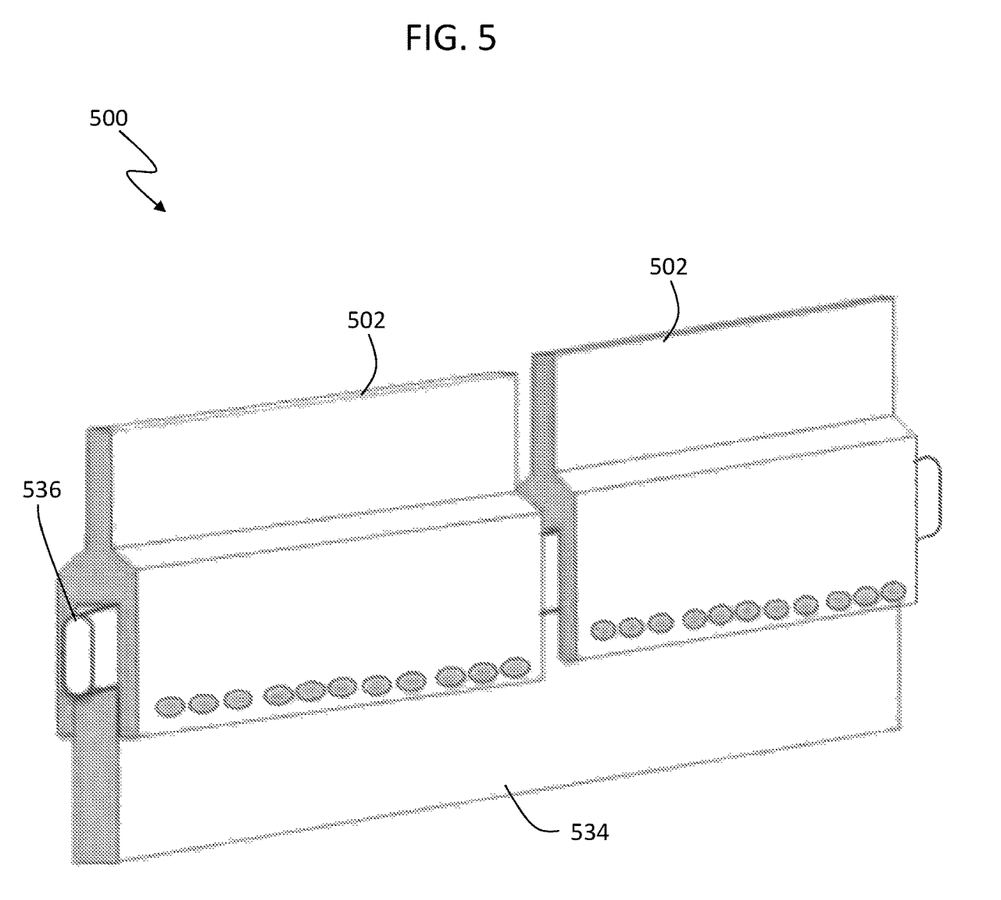
FIG. 5 is a schematic illustration of a separation device assembly in accordance with an embodiment of the present disclosure.

For example, turning not to FIG. 5, another separation device assembly 500 in accordance with an embodiment of the present disclosure is shown. The separation device assembly 500 is similar to that shown and described above, and thus similar features will not be described again for brevity. In this embodiment, the separation device assembly 500 includes a plurality of first segment elements 502 that are attachable to a longer second segment element 534. Also shown in FIG. 5 is an example of an expansion device 536 that is located within an expansion device cavity formed between the first segment elements 502 and the second segment element 534. In one embodiment, there is a gap between end walls of adjacent first segment elements 502. In another embodiment, the end walls of adjacent first segment elements 502 are in contact or are coupled together.

In some embodiments, the first and second segment elements may be the same size, but are offset from each other. In other embodiments, the first and second segment elements can be of different lengths. For example, as shown and described above, in some embodiments, each of the first and second segment elements include fastener apertures that can align to permit fasteners to securely attach the first and second segment elements to form a separation device assembly (see, e.g., FIG. 4). In some embodiments, each first segment element can be of a length that includes six or more fastener apertures whereas the second segment elements can be of a length that includes five or fewer fastener apertures. Such arrangement can ensure sufficient overlap and/or offset to provide structural rigidity to the formed separation device assembly.

Advantageously, embodiments described herein provide segmented separation assemblies (e.g., frangible joint assemblies) that can be manufactured in high quantities, regardless of the specific application for joining (and then separating) structural components (e.g., components of spacecraft, launch vehicles, etc.). That is, separation assemblies in accordance with embodiments of the present disclosure can be manufactured to any desired length by joining a given number of segment elements. Embodiments of the present disclosure provide improved manufacturing and reduced costs due to much smaller and segmented construction, as compared to typical separation device assemblies.

Components of the present disclosure, e.g., the first and second segment elements of the separation device assemblies can be fabricated using various techniques. For example, machining, extruding, and/or additive manufacturing can be employed without departing from the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about"

used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A separation device assembly comprising:
a plurality of first segment elements arranged in series adjacent each other, each first segment element having an attachment portion and a frangible portion, the attachment portion of the first segment elements is arranged to fixedly connect to a first structural component; and
a plurality of second segment elements each having an attachment portion and a securing portion, wherein the attachment portion of the at least one second segment element is arranged to fixedly connect to a second structural component, the plurality of second segment elements including a first second segment element;
wherein at least two adjacent first segment elements of the plurality of first segment elements are attached to the first second segment element, wherein a first segment joint is formed between adjacent first segment elements;
wherein an expansion device cavity is formed between the attached first and second segment elements.

2. The separation device assembly of claim 1, wherein each first segment element includes a fracture groove.

3. The separation device assembly of claim 1, wherein the frangible portion of each first segment element comprises a first arm and a second arm.

4. The separation device assembly of claim 1, further comprising a gap located between adjacent first segment elements when attached to the first second segment element.

5. The separation device assembly of claim 1, wherein the first second segment element has a length that is longer than a single first segment element.

6. The separation device assembly of claim 1, further comprising an expansion device located within the expansion device cavity, wherein expansion of the expansion device causes the frangible portions of the first segment elements to separate the separation device assembly.

7. The separation device assembly of claim 1, wherein each second segment element is a same length as each first segment element.

8. The separation device assembly of claim 1, wherein each second segment element is a length that is shorter than each first segment element.

9. The separation device assembly of claim 1, wherein each first segment element comprises a plurality of fastener apertures and each second segment element comprises a plurality of fastener apertures.

10. A separation device assembly comprising:
a plurality of first segment elements, each first segment element having an attachment portion and a frangible portion, the attachment portion of the first segment elements is arranged to fixedly connect to a first structural component; and
at least one second segment element having an attachment portion and a securing portion, wherein the attachment portion of the at least one second segment element is arranged to fixedly connect to a second structural component;
wherein at least two of the plurality of first segment elements are attached to the at least one second segment element adjacent to each other, wherein a first segment joint is formed between adjacent first segment elements;
wherein an expansion device cavity is formed between the attached first and second segment elements;
wherein the at least one second segment element comprises a plurality of second segment elements; and
wherein a first segment joint is formed between adjacent first segment elements and a second segment joint is formed between adjacent second segment elements, and wherein when the first segment elements are attached to the second segment elements, the first segment joints do not align with the second segment joints.

11. The separation device assembly of claim 10, wherein at least one of the first segment joints and the second segment joints includes a gap between the adjacent first segment elements or the adjacent second segment elements.

12. The separation device assembly of claim 11, wherein the gap is a spacing that is at or below a predetermined or preset distance.

13. The separation device assembly of claim 10, wherein both the first segment joints and the second segment joints include a gap between the adjacent first segment elements and the adjacent second segment elements.

14. The separation device assembly of claim 1, wherein each first segment element is five feet in length or less and each second segment element is five feet in length or less.

15. The separation device assembly of claim 1, wherein each first segment element is five feet in length or less.

16. The separation device assembly of claim 15, wherein the second segment element is ten feet in length or longer.

* * * * *